R. P. AND W. H. CLARK.
SHOCK ABSORBER FOR VEHICLES.
APPLICATION FILED OCT. 27, 1917.
1,335,557.
Patented Mar. 30, 1920.
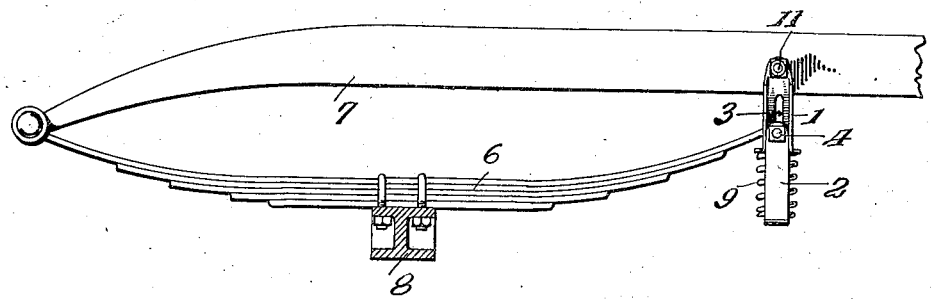
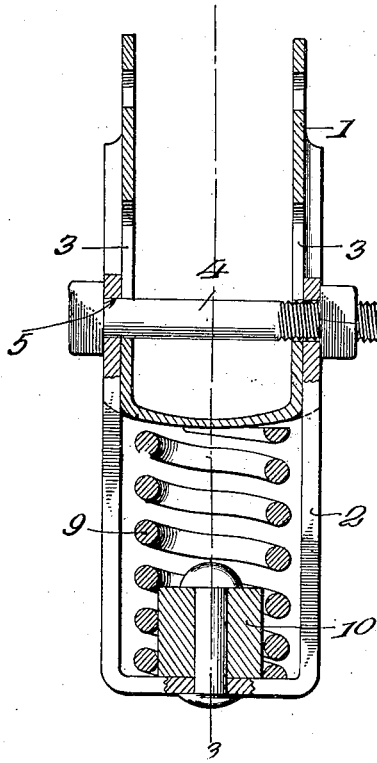
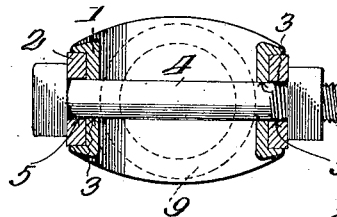
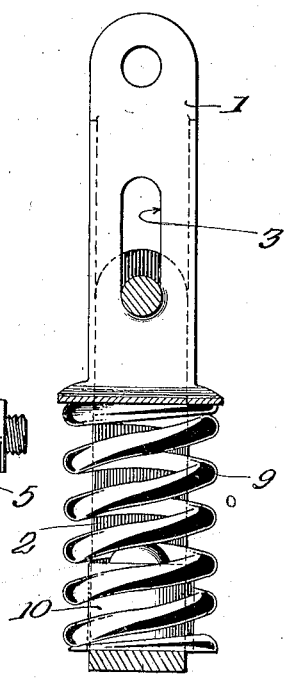

UNITED STATES PATENT OFFICE.

ROBERT P. CLARK AND WILLIAM H. CLARK, OF FRESNO, CALIFORNIA.

SHOCK-ABSORBER FOR VEHICLES.

1,335,557. Specification of Letters Patent. Patented Mar. 30, 1920.

Application filed October 27, 1917. Serial No. 198,844.

*To all whom it may concern:*

Be it known that we, ROBERT P. CLARK and WILLIAM H. CLARK, citizens of the United States, residing at Fresno, in the county of Fresno and State of California, have invented certain new and useful Improvements in Shock-Absorbers for Vehicles, of which the following is a specification.

Our invention relates to an improvement in shock-absorbers for vehicles, and is adapted more particularly to motor-vehicles equipped with the various modern types of spring suspension, the present invention being a greatly simplified shock-absorber capable of attachment to almost any modern type of spring-suspension. Its purpose is to reduce or eliminate shock at the forward end of the car or vehicle, and to prevent spring and frame breakage, thus reducing the wear and tear on the entire vehicle, and especially upon the tires, thereby greatly prolonging the life and usefulness not only of the tires but also of the machine as a whole.

In the accompanying drawings:—

Figure 1 is a view in side elevation showing our improved shock-absorber attached to the forward end of the vehicle-frame;

Fig. 2 is an enlarged transverse vertical section;

Fig. 3 is a sectional view at right-angles to that shown in Fig. 2 on the line 3—3 thereof; and Fig. 4 is a horizontal section through Figs. 2 and 3 at the point where the bolt is located.

Our present form of shock-absorber comprises two main U-shaped sections 1 and 2 slidably fitted and connected together. Section 1 is preferably made of channel-iron, the flanges of which extend outwardly to slidably embrace the sides of section 2, which latter fit these channels.

Elongated vertically-disposed slots 3 are formed in the sides of section 1, and a bolt 4 extends through these slots 3, 3, and through holes 5 in the upper ends of the lower section 2 of the shock-absorber, and constitutes the attachment for the rear end of the forward semi-elliptic spring 6, as shown in Fig. 1, said spring 6 being connected in the usual manner to the forward end of the frame 7, and secured in the usual fashion to the axle 8. The U-shaped sections 1 and 2 are open at the sides, and the spiral spring 9 is interposed between the lower ends of these two sections, it being insertible through the side without dismembering or dismantling the shock-absorber, it being held in place by a stud 10 upstanding from the lower end of the lower section 2.

The shock-absorber is fastened to the frame 7 of the vehicle by a bolt 11 extending through holes in the upper end of section 1.

Thus we have constructed a shock-absorber of practically three parts, namely the two U-shaped slidably connected sections 1 and 2, and the stiff spiral spring 9 interposed between their lower ends, and which is compressed and absorbs the jolts and jars as the wheels move over a rough place, or an obstruction in the road.

We claim:

A shock-absorber comprising upper and lower U-shaped sections, the upper section provided with outwardly extending flanges and elongated slots therebetween running parallel with the flanges, the lower section fitted and guided between the flanges and slidably connected with the slotted section, a connecting bolt extending through the upper end of the lower section and through the slots of the upper section, and a spring interposed between the centers of the two sections.

In testimony whereof we affix our signatures.

ROBERT P. CLARK.
WILLIAM H. CLARK.